(12) United States Patent
Krivec et al.

(10) Patent No.: US 8,387,997 B2
(45) Date of Patent: Mar. 5, 2013

(54) STEERING ARRANGEMENT FOR VEHICLES

(75) Inventors: Eduard Krivec, Hangweg (AT);
Thomas Gross, Hauergasse (AT)

(73) Assignee: Sandvik Mining and Construction GmbH, Zeltweg (AT)

( * ) Notice: Subject to any disclaimer, the term of this patent is extended or adjusted under 35 U.S.C. 154(b) by 184 days.

(21) Appl. No.: 12/733,187

(22) PCT Filed: Aug. 25, 2008

(86) PCT No.: PCT/AT2008/000300
§ 371 (c)(1),
(2), (4) Date: Mar. 24, 2010

(87) PCT Pub. No.: WO2009/026601
PCT Pub. Date: Mar. 5, 2009

(65) Prior Publication Data
US 2010/0194067 A1    Aug. 5, 2010

(30) Foreign Application Priority Data
Aug. 24, 2007    (AT) .................................. A 1326/2007

(51) Int. Cl.
*B62D 7/14* (2006.01)
(52) U.S. Cl. .......................... 280/91.1; 180/234; 280/99
(58) Field of Classification Search ............... 280/91.1, 280/98, 99, 93.506; 180/234
See application file for complete search history.

(56) References Cited

U.S. PATENT DOCUMENTS

| | | | | |
|---|---|---|---|---|
| 81,217 A | * | 8/1868 | Sexton | 280/99 |
| 1,470,328 A | * | 10/1923 | Nabors | 280/99 |
| 1,728,818 A | * | 9/1929 | Arato | 280/99 |
| 2,357,742 A | * | 9/1944 | Jeffrey | 180/253 |
| 2,457,569 A | * | 12/1948 | Lee | 414/528 |
| 2,653,696 A | * | 9/1953 | Moon | 198/308.1 |
| 2,699,954 A | * | 1/1955 | Harris et al. | 280/124.118 |
| 2,756,066 A | * | 7/1956 | Ludowici | 180/409 |
| 2,812,191 A | * | 11/1957 | Kersey, Jr. et al. | 180/409 |
| 2,901,846 A | * | 9/1959 | Armington | 172/811 |
| 2,910,131 A | * | 10/1959 | Krotz | 180/234 |
| 3,077,354 A | * | 2/1963 | Rateau | 280/99 |
| 3,103,985 A | * | 9/1963 | Price, Jr. | 180/414 |
| 3,314,690 A | * | 4/1967 | Bunchak | 180/24 |
| 3,529,848 A | * | 9/1970 | Harvey | 280/99 |

(Continued)

FOREIGN PATENT DOCUMENTS

BE      415780      6/1936
GB      1 495 049   12/1977

(Continued)

*Primary Examiner* — Joseph Rocca
*Assistant Examiner* — Barry Gooden, Jr.
(74) *Attorney, Agent, or Firm* — Chapman and Gutler

(57) ABSTRACT

In a steering arrangement for vehicles, in particular underground transport vehicles, including at least four steerable wheels (2), wherein, during cornering, a respective curve-inner wheel is turned more sharply than the respective curve-outer wheel, at least two wheels (2) located opposite each other in respect to the longitudinal center plane of the vehicle are coupled with each other via angle levers (21) and a tie rod (22) connected to the angle levers (21). Curve-inner or curve-outer wheels consecutively arranged in the longitudinal direction of the vehicle are coupled to common pivotal movement via a gear. The angle levers (21), via a coupling rod (24), are each connected with a steering lever (13) each connected with a steerable wheel (2) via a steering rod (10).

14 Claims, 4 Drawing Sheets

U.S. PATENT DOCUMENTS

| | | | | |
|---|---|---|---|---|
| 3,596,730 A | * | 8/1971 | Cecce | 180/236 |
| 4,798,393 A | * | 1/1989 | Miura et al. | 180/409 |
| 5,288,091 A | * | 2/1994 | Deschamps | 180/409 |
| 5,996,722 A | * | 12/1999 | Price | 180/403 |
| 6,926,111 B1 | * | 8/2005 | Irikura | 180/234 |
| 7,044,244 B2 | * | 5/2006 | Irikura | 180/6.26 |
| 7,909,122 B2 | * | 3/2011 | Schena et al. | 180/19.1 |
| 7,922,184 B2 | * | 4/2011 | Porcheron | 280/93.506 |
| 2003/0197342 A1 | * | 10/2003 | Bidwell | 280/91.1 |

FOREIGN PATENT DOCUMENTS

SU             1118574 A      10/1984

\* cited by examiner

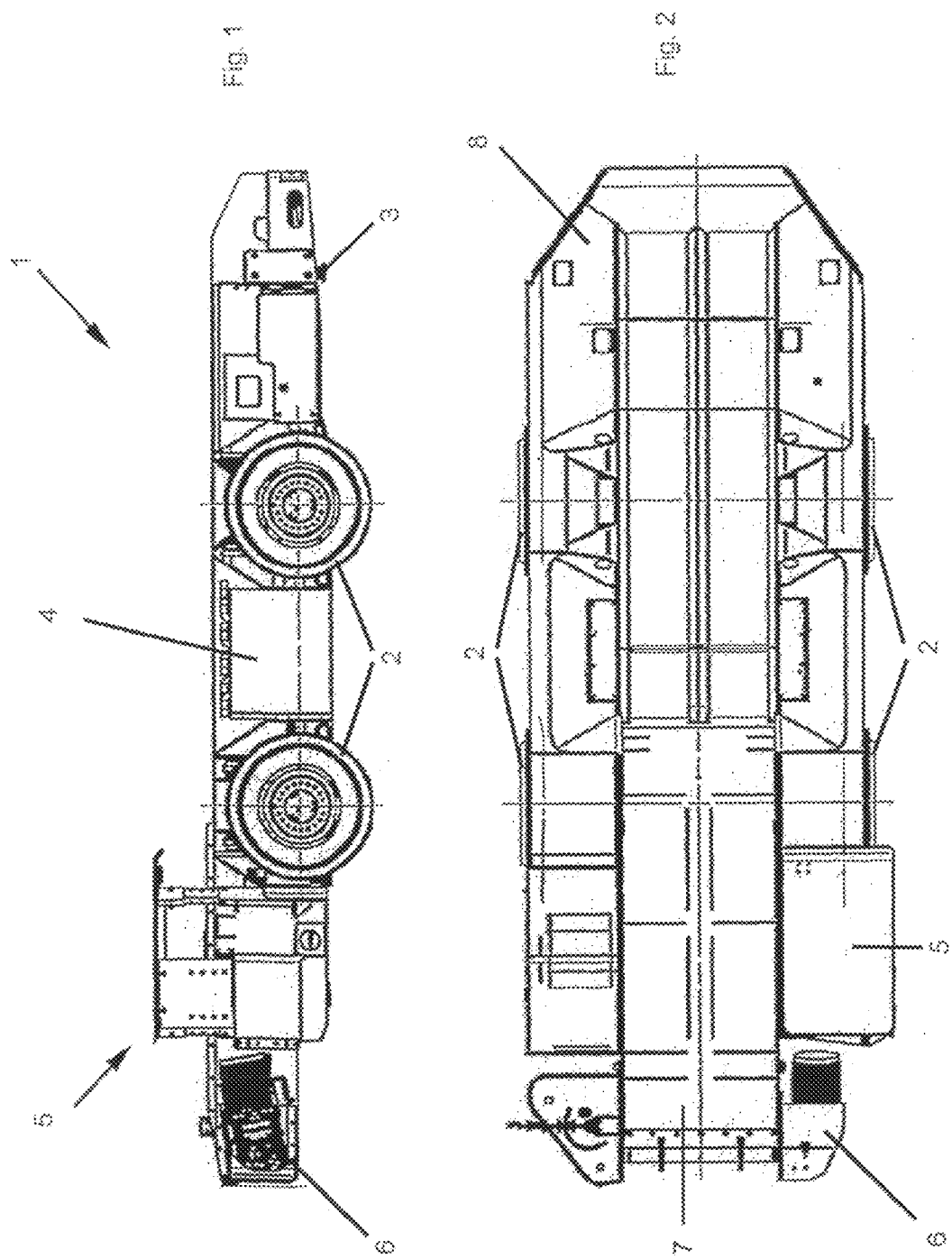

STEERING ARRANGEMENT FOR VEHICLES

The invention relates to a steering arrangement for vehicles, in particular underground transport vehicles, including at least four steerable wheels, wherein, during cornering, a respective curve-inner wheel is turned more sharply than the respective curve-outer wheel.

Underground transport vehicles and, in particular, so-called shuttle cars are only used with mechanical steering systems, whereby, as a rule, the optimum steering geometry according to the Ackermann steering principle will not be reached completely. The Ackermann steering principle defines the optimum steering geometry in a manner that the lines extended from all wheel axes meet in a common curve center during cornering. From these geometric considerations results that the curve-inner wheels have to be turned more sharply than the curve-outer wheels in order to ensure that no excessive abrasion and wear of the tires will be observed during cornering.

A mechanical control mechanism for a shuttle car can be taken from U.S. Pat. No. 2,590,300. In that known configuration, individually driven wheels are connected with one another via a linkage mechanism, wherein a rigid shaft is used for coupling the steering gears on both sides of the vehicle. There are provided steering gears which are to safeguard an appropriate diametrically opposed steering turn when running on a curve, wherein the steering rods coupled to those steering gears are arranged in a crosswisely offset manner, centrically opposite steering rods each having identical lengths and rods consecutively arranged in the longitudinal direction of the vehicle having different lengths. The bearings of the steering gears and the application points for the coupled steering rods are each located on different levels, thus enabling a small compensation of the turn angle of the inner wheels relative to the outer wheels.

Despite complex lever mechanisms, steering angle compensation between the inner and outer wheels is, however, only insufficiently realized in accordance with the Ackermann steering principle such that an excessive tire abrasion is still observed under the floor conditions of underground working.

The invention aims to provide a steering arrangement of the initially defined kind, by which the Ackermann steering principle will be met better when used in an underground vehicle so as to achieve reduced wear of the tires. To solve this object, the configuration according to the invention, departing from the initially mentioned steering arrangement, essentially consists in that at least two wheels located opposite each other in respect to the longitudinal center plane of the vehicle are coupled with each other via angle levers and a tie rod connected to the angle levers, that curve-inner or curve-outer wheels consecutively arranged in the longitudinal direction of the vehicle are coupled, via a gear, to a common pivotal movement during which the extended axes of the curve-inner or curve-outer wheels intersect, and that the angle levers, via a coupling rod, are each connected with a steering lever each connected with a steerable wheel via a steering rod. Deviating from the known configuration, in which a common shaft was provided for coupling the two steering systems on both sides of the vehicle, coupling of the curve-inner with the curve-outer steering systems according to the invention no longer is achieved by a rigid connection shaft, but by a linkage system. This linkage system is comprised of the tie rod and the angle levers, whereby the use of this linkage system provides a connection between the two steering systems, which, by the lever transmissions, the respective tie rod lengths and the geometric arrangement of the levers, enables the optimum adjustment of the differential angle between the inner and outer wheels during cornering.

The preferred dimensioning in this context provides that the length of the tie rod corresponds to 0.3 to 0.7 times, preferably half, the track width of the wheels, such a configuration allowing for a largely symmetrical structure of the steering mechanism on both sides of the transport vehicle. The angle compensation to the inner and outer wheels is, in fact, substantially influenced by the length of the tie rod, wherein it has been shown that shorter tie rods provide more favorable geometries. With tie rods that are too short, large bearing forces will, however, act on the angle levers because of substantially smaller lever arms, so that the proposed dimensioning of the tie rod will provide an optimum ratio.

For the steering arrangement of the invention, a single tie rod will preferably do for all four wheels.

The transmission of the desired motion to the individual wheels according to the invention is effected in a manner that the angle levers connected to the tie rod are each connected, via a coupling rod, with a steering lever each connected with a steerable wheel via a steering rod. Thereby, the steering characteristics can be influenced with the suitable dimensioning and geometric arrangement of the steering lever ensuring the desired steering angle transmission and optionally also the desired course of the steering angle transmission as a function of the steering turn. By correct dimensioning, it is feasible to ensure the Ackermann steering principle in a highly precise manner.

In a particularly simple manner, the configuration according to the invention is devised such that the angle levers are mounted on the vehicle frame so as to be pivotable about axes extending transversely to the longitudinal direction of the vehicle and, preferably, parallelly with the longitudinal central plane.

A reduction of the forces acting on the bearings in the individual angular positions or pivoted positions will be achieved in that the pivot axes of the steering levers and the pivot axes of the angle levers connected with the tie rod intersect at an angle of about 90°, wherein a completely symmetrical and hence largely force-neutral configuration will be achieved in that the lengths of all the tie rods which are connected with steering levers and steerable wheels are approximately equally long.

Coupling to a common pivotal movement, of the curve-inner or curve-outer wheels consecutively arranged in the longitudinal direction of the vehicle is preferably effected in a manner that two steering levers are each provided for wheels consecutively arranged in the longitudinal direction of the vehicle, which are coupled to pivoting in opposite directions.

The desired pivoting in opposite directions or senses, of neighboring wheels on one side of the vehicle can be achieved in a simple manner in that neighboring steering levers are connected to pivoting in opposite directions by a coupling rod, said coupling rod, on a steering lever, engaging the lever arm connected with the steering rod and, on the neighboring steering lever, engaging a lever arm facing away from the articulation of the steering rod, wherein, in a particularly simple manner, the steering drive engages a steering lever.

Due to the largely symmetrical structure of the steering system provided according to the invention, equally large steering forces will substantially be achieved for all pairs of wheels, wherein the steering lever should each be inwardly inclined in the neutral position in order to obtain the most favorable application points. A steering drive formed by hydraulic cylinder piston units may each be powered with different pressures on either side of the units for the force compensation of the area ratios in the piston chamber and the rod chamber in order to achieve compensation and hence equal forces also there.

In the following, the invention will be explained in more detail by way of an exemplary embodiment schematically illustrated in the drawing. Therein, FIG. 1 is a side view of a vehicle equipped with a steering arrangement according to the invention;

FIG. 2 is a top view on the illustration of FIG. 1;

Figure 5:
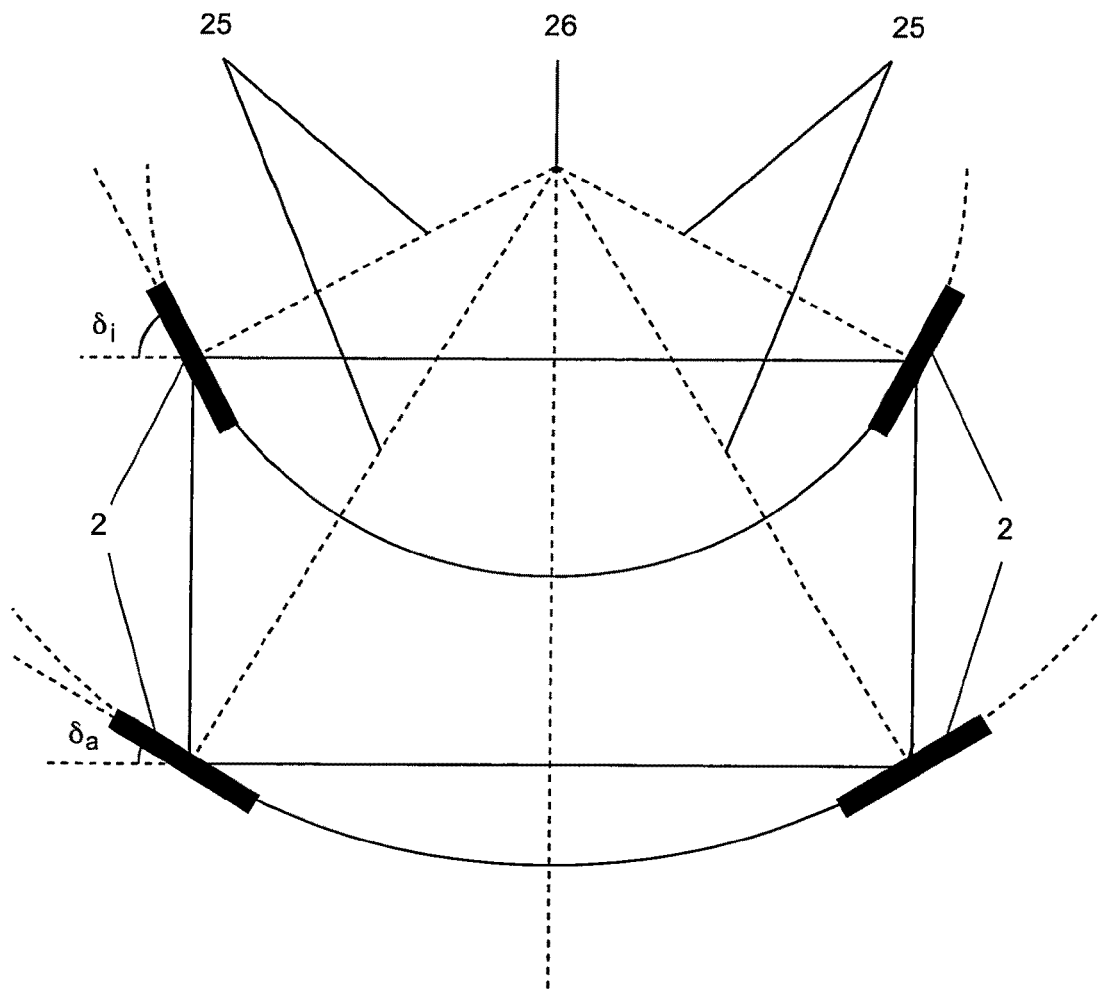

FIG. 5 schematically depicts the Ackermann steering principle.

From FIG. 1, a transport vehicle 1 is apparent, whose driven wheels are denoted by 2. Near the front end of the transport vehicle 1, a car lifting device indicated by 3 can be seen. A part of the energy supply and, in particular, an electric box is denoted by 4. Beside a driver's cab 5, parts 6 of the drive for a conveyor chain or a conveyor belt are visible, which is denoted by 7 in FIG. 2. Material charging takes place via a charging chute 8 apparent from FIG. 2.

Figure 3:
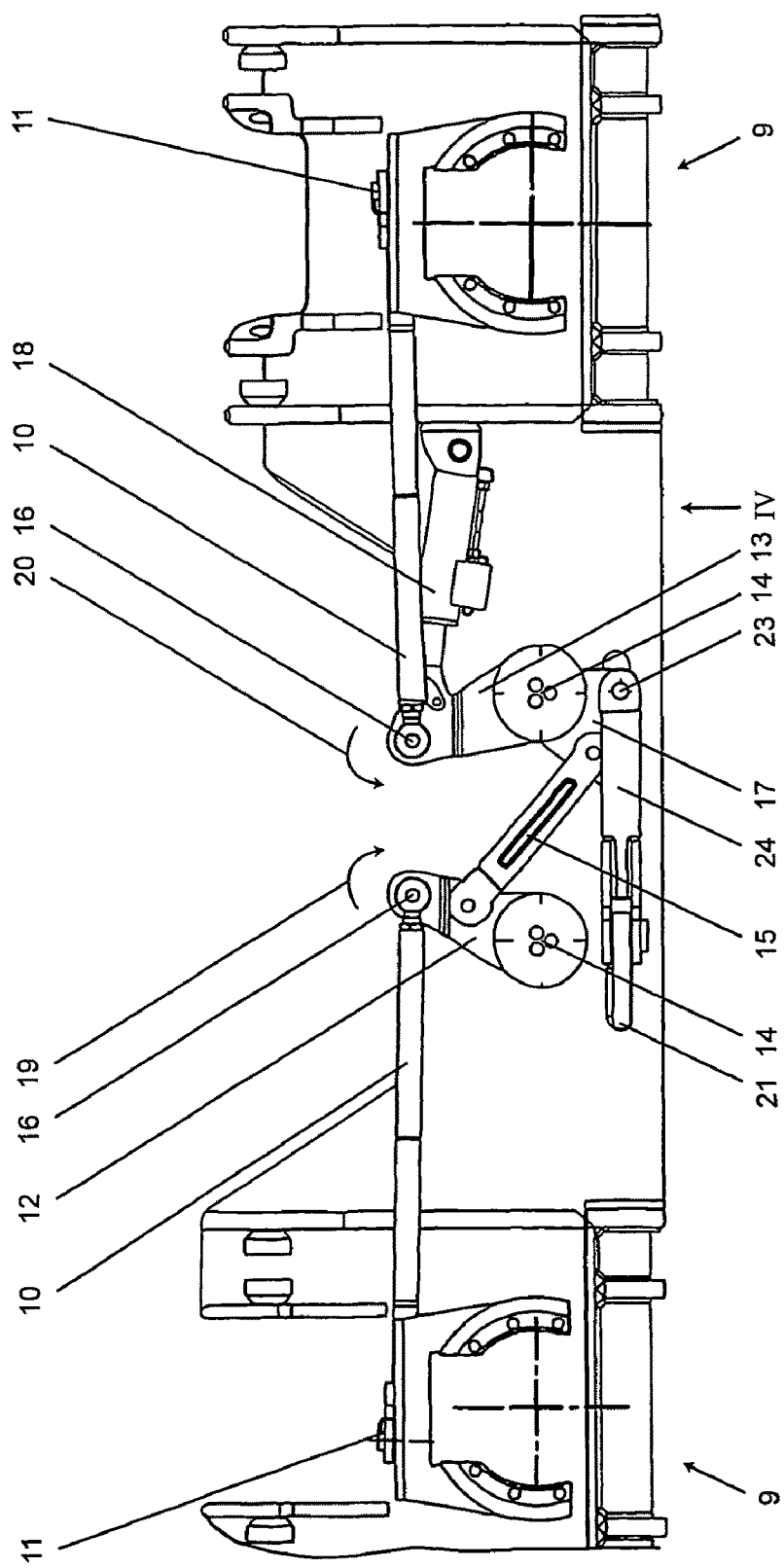
FIG. 3 is a side view of the levers and rods provided for the steering of the wheels on one side.

In FIG. 3, support structures 9 for the wheels 2 as well as parts of the steering drive effecting steering are to be seen. In addition to steering rods 10 eccentrically engaging the bearing sites 11 of the wheel suspensions, FIG. 3 above all depicts steering levers 12 and 13. The steering lever 12 is each designed as a single-armed lever and pivotable about an axis 14. A coupling rod engaging the steering lever 12 near the articulation 16 for the steering rod is denoted by 15. The neighboring steering lever 13, which is designed as a double-armed lever, is engaged by the coupling rod 15 on the lever arm 17 located opposite the articulation 16 for the steering rod 10, the pivot axis being again denoted by 14. Position 18 denotes a steering drive part which engages the steering lever 13.

Figure 4:
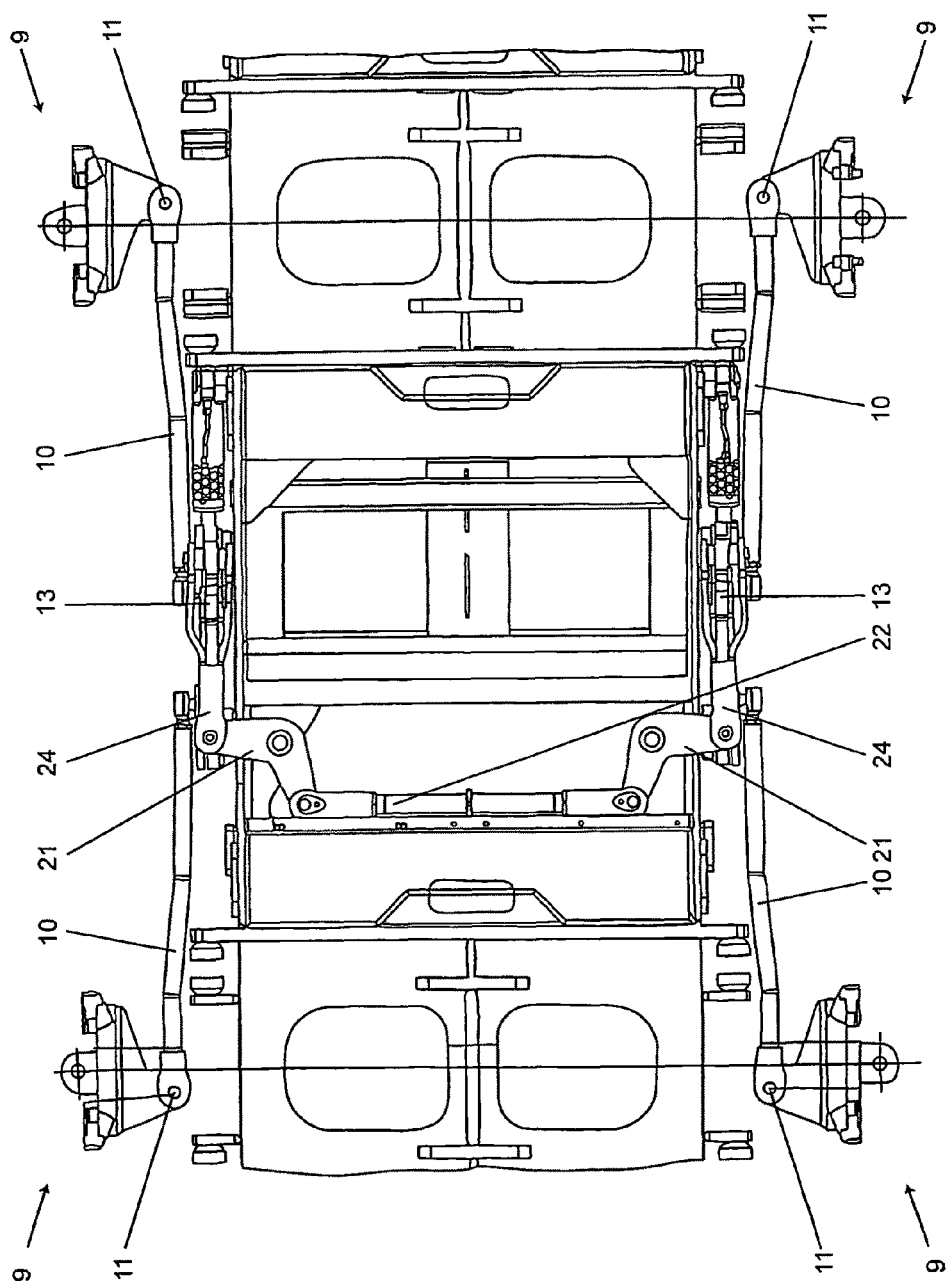
FIG. 4 is a view in the sense of arrow IV of FIG. 3.

The coupling rod 15 ensures that, at a pivotal movement of the steering lever 12 in the sense of arrow 19, pivoting of the steering lever 13 in the opposite direction, i.e. in the sense of arrow 20, will be effected so as to cause the two wheels to be pivoted in opposite directions. Below the pivot axes 14 of the steering levers, an angle lever is denoted by 21, the details of this coupling being clearly apparent from FIG. 4. The angle levers 21 by their respective inwardly projecting arms engage a tie rod 22 which is itself dimensioned so as to be approximately half as long as the track width, i.e. the distance between the wheel suspensions 9, on both sides of the vehicle.

As is apparent from FIG. 3, the angle levers 21 engage the articulation 23 of the steering lever 13 via a coupling rod 24, the appropriate coupling of the two steering drives on both sides of the vehicle being effected by the two angle levers 21. The geometry defined by the angle levers 21 and the tie rod 22 enables pivoting in such a manner that the wheels 2 will be more sharply turned on the respective curve-inner side than the wheels 2 of the respective curve-outer side.

The corresponding steering principle is elucidated in FIG. 5, the axes of the wheels 2 are each denoted by 25, said axes 25 meeting in a point 26 during cornering according to the Ackermann steering principle as illustrated in FIG. 5. From this condition follows that the turn angle δi of the inner wheels 2 must be larger than the turn angle δa of the curve-outer wheels in order to comply with the geometric condition that the extended axes intersect in a common point 26.

The invention claimed is:

1. A steering arrangement for a vehicle having at least four steerable wheels (2), adapted, during cornering, to have a respective curve-inner steerable wheel turned more sharply than a respective curve-outer steerable wheel, said steering arrangement comprising angle levers (21), and a tie rod (22) connected to the angle levers (21), wherein at least two of said steerable wheels (2) located opposite each other with respect to a longitudinal center plane of the vehicle are coupled with each other via said angle levers (21), curve-inner or curve-outer steerable wheels (2) consecutively arranged in a longitudinal direction of the vehicle are coupled to common pivotal movement via a gear, each of the angle levers (21), via a coupling rod (24), is connected with a steering lever (13) connected with one of said steerable wheels (2) via a steering rod (10), a first one and a second one of said steering levers (12, 13) are each provided for steerable wheels (2) consecutively arranged in the longitudinal direction of the vehicle, said first and second steering levers (12, 13) being coupled to pivot in opposite directions, and pivot axes (14) of the first and second steering levers (12, 13) and pivot axes of the angle levers (21) connected with the tie rod (22) intersect at an angle of about 90°.

2. A steering arrangement for a vehicle according to claim 1, wherein neighboring first and second steering levers (12, 13) are connected to pivot in opposite directions by a coupling rod (15), said coupling rod (15), on said first steering lever (12), engages a lever arm connected with the steering rod (10), and said coupling rod (15), on said second steering lever (13), engages a lever arm (17) facing away from an articulation (16) of the steering rod (10).

3. A steering arrangement for a vehicle according to claim 1, wherein the vehicle is an underground transport vehicle.

4. A steering arrangement for a vehicle according to claim 1, wherein a length of the tie rod (22) corresponds to one-half of a track width of the steerable wheels (2).

5. A steering arrangement for a vehicle according to claim 1, wherein the angle levers (21) are mounted on a frame of the vehicle so as to be pivotable about axes extending transversely to the longitudinal direction of the vehicle and parallelly with the longitudinal central plane of the vehicle.

6. A steering arrangement for a vehicle according to claim 1, wherein the angle levers (21) are mounted on a frame of the vehicle so as to be pivotable about axes extending transversely to the longitudinal direction of the vehicle.

7. A steering arrangement for a vehicle according to claim 6, wherein lengths of said steering rods (10) connected with said first and second steering levers (12, 13) and steerable wheels (2) are approximately equal.

8. A steering arrangement for a vehicle according to claim 1, wherein lengths of said steering rods (10) connected with said first and second steering levers (12, 13) and steerable wheels (2) are approximately equal.

9. A steering arrangement for a vehicle according to claim 8, wherein neighboring first and second steering levers (12, 13) are connected to pivot in opposite directions by a coupling rod (15), said coupling rod (15), on said first steering lever (12), engages a lever arm connected with the steering rod (10), and said coupling rod (15), on said second steering lever (13), engages a lever arm (17) facing away from an articulation (16) of the steering rod (10).

10. A steering arrangement for a vehicle according to claim 1, wherein a steering drive (18) engages each of said first and second steering levers (12, 13).

11. A steering arrangement for a vehicle according to claim 10, wherein lengths of said steering rods (10) connected with said first and second steering levers (12, 13) and steerable wheels (2) are approximately equal.

12. A steering arrangement for a vehicle according to claim 1, wherein a length of the tie rod (22) corresponds to 0.3 to 0.7 times a track width of the steerable wheels (2).

13. A steering arrangement for a vehicle according to claim 12, wherein lengths of said steering rods (10) connected with said first and second steering levers (12, 13) and steerable wheels (2) are approximately equal.

14. A steering arrangement for a vehicle according to claim 12, wherein
- neighboring first and second steering levers (12, 13) are connected to pivot in opposite directions by a coupling rod (15),
- said coupling rod (15), on said first steering lever (12), engages a lever arm connected with the steering rod (10), and
- said coupling rod (15), on said second steering lever (13), engages a lever arm (17) facing away from an articulation (16) of the steering rod (10).

\* \* \* \* \*